US012650672B2

(12) United States Patent
Quendt et al.

(10) Patent No.: US 12,650,672 B2
(45) Date of Patent: Jun. 9, 2026

(54) CONTROL SYSTEM METHOD FOR CONTROLLING AN APPARATUS OR INSTALLATION

(71) Applicant: Siemens Aktiengesellschaft, Munich (DE)

(72) Inventors: Bernhard Quendt, Feucht (DE); Frank Dittrich Schiller, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 639 days.

(21) Appl. No.: 18/015,810

(22) PCT Filed: Jul. 2, 2021

(86) PCT No.: PCT/EP2021/068326

§ 371 (c)(1),
(2) Date: Jan. 12, 2023

(87) PCT Pub. No.: WO2022/012971

PCT Pub. Date: Jan. 20, 2022

(65) Prior Publication Data

US 2023/0259095 A1 Aug. 17, 2023

(30) Foreign Application Priority Data

Jul. 13, 2020 (EP) .................................. 20185513

(51) Int. Cl.
*G05B 19/406* (2006.01)

(52) U.S. Cl.
CPC .. *G05B 19/406* (2013.01); *G05B 2219/50193* (2013.01)

(58) Field of Classification Search
CPC ........ G05B 19/406; G05B 2219/50193; G05B 23/0291; G05B 19/058; G05B 9/03; G06F 11/1004; G06F 11/182; G06F 11/1487
See application file for complete search history.

(56) References Cited

U.S. PATENT DOCUMENTS

| | | | |
|---|---|---|---|
| 2008/0209211 A1* | 8/2008 | Grgic ....................... | G05B 9/03 |
| | | | 713/166 |
| 2013/0158681 A1 | 6/2013 | Hamm et al. | |

(Continued)

FOREIGN PATENT DOCUMENTS

| | | |
|---|---|---|
| CN | 104508635 | 4/2015 |
| DE | 10219501 B4 | 4/2010 |

(Continued)

OTHER PUBLICATIONS

S. Subkraut and J. Kaienburg. "Safety-Critical Smart Systems with Software Coded Processing." Silistra Systems GmbH, Smart Systems Integration Copenhagen, Denmark (2015) (Year: 2015).*

(Continued)

*Primary Examiner* — Christopher E. Everett
(74) *Attorney, Agent, or Firm* — Cozen O'Connor

(57) ABSTRACT

A control system for controlling an apparatus or installation, wherein at least one first safety function controls the apparatus or installation, where the control system includes a first safety-oriented control device that is configured to perform the at least one first safety function, where the first safety-oriented control device is also configured as a first safety-oriented control application that is implemented in a cloud, and where the first safety oriented control application and the apparatus or installation are communicatively coupled via a first safety-oriented communication connection.

16 Claims, 5 Drawing Sheets

(56) References Cited

U.S. PATENT DOCUMENTS

| | | | | |
|---|---|---|---|---|
| 2016/0282843 A1* | 9/2016 | Michalscheck | .... | G05B 19/4185 |
| 2018/0052451 A1* | 2/2018 | Billi-Duran | ...... | G05B 19/41835 |
| 2019/0018401 A1 | 1/2019 | Grosch et al. | | |
| 2019/0302742 A1 | 10/2019 | Grosch et al. | | |
| 2020/0033832 A1 | 1/2020 | Meyer-Graefe | | |
| 2020/0074828 A1* | 3/2020 | Mousavi | ............ | G05B 19/0428 |
| 2021/0278816 A1 | 9/2021 | Schweiker et al. | | |

FOREIGN PATENT DOCUMENTS

| | | |
|---|---|---|
| DE | 102018118243 | 1/2020 |
| DE | 102018120347 | 2/2020 |
| EP | 342748 | 11/1989 |
| WO | 2016138956 | 9/2016 |

OTHER PUBLICATIONS

PCT International Search Report dated Sep. 6, 2021 based on PCT/EP2021/068326 filed Jul. 2, 2021.

Cunningham, Douglas et al: "Safety Functions on Commodity Hardware with Diversified Encoding"; Informatik 2015 Lecture Notes in Informatics (LNI); Gesellschaft für Informatik; Jan. 1, 2015.

Forin, P. et al. "Vital coded microprocessor principles and application for various transit systems", IFA-GCCT, pp. 79-84, Sep. 1989.

Schiffel, Ute et al. "An encoding compiler: Building safety-critical systems with commodity hardware", SAFECOMP'09: Proceedings of the 28th International Conference on Computer Safety, Reliability, and Security, Berlin, Heidelberg, Springer-Verlag, pp. 283-296, 2009.

Schiffel, Ute et al. "ANB-and ANBDmem-Encoding: Detecting Hardware Errors in Software", Erwin Schoitsch, editor, Computer Safety, Reliability, and Security, vol. 6351 of Lecture Notes in Computer Science, Springer Berlin / Heidelberg, pp. 169-182, 2010.

Oh, N. et al. "ED4I: error detection by diverse data and duplicated instructions", IEEE Transactions on Computers, vol. 51, Issue 2, pp. 180-199, Feb. 2002.

* cited by examiner

CONTROL SYSTEM METHOD FOR CONTROLLING AN APPARATUS OR INSTALLATION

CROSS-REFERENCE TO RELATED APPLICATIONS

This is a U.S. national stage of application No. PCT/EP2021/068326 filed 2 Jul. 2021. Priority is claimed on European Application No. 20185513.7 filed 13 Jul. 2020, the content of which is incorporated herein by reference in its entirety.

BACKGROUND OF THE INVENTION

1. Field of the Invention

The present invention relates to a control system for controlling an apparatus or installation, where at least one first safety function is provided with respect to controlling the apparatus or installation, and where the control system comprises a first safety-oriented control device that is configured to execute the at least one first safety function.

2. Description of the Related Art

Published patent application DE 10 2018 118 243 A1 discloses a safety system with a controller connected to one or a plurality of spatially distributed machines via a cloud, e.g., a server or a database. Here, the controller can be a safety controller that satisfies a safety standard. The controller communicates, for example, via a secure data connection, a command to be executed by the machine, in particular a safety-relevant command. The command can be stored in the cloud, where it is provided to the machine for retrieval. The machine can then retrieve the command from the cloud and execute it.

One disadvantage of the such a conventional safety system is that the safety technology used in this context is relatively inflexible.

SUMMARY OF THE INVENTION

It is therefore an object of the present invention to provide a safety-oriented control system that is more flexible.

This and other object and advantages are achieved in accordance with the invention by a control device that is configured for controlling an apparatus or installation, where at least one first safety function is provided with respect to controlling the apparatus or installation. Here, the control system comprises a first safety-oriented control device that is configured to execute the at least one first safety function.

Here, the first safety-oriented control device is configured as a first safety-oriented control application implemented in a cloud, where the first safety-oriented control application and the apparatus or installation are communicatively coupled via a first safety-oriented communication connection.

Such a control system makes it possible, for example, to use the cloud as a temporary or permanent replacement for a separate safety controller. In this case, the safety functions are processed completely in the cloud. A secure communication between the first safety-oriented control application and the apparatus or installation, such as with PROFIsafe, is advantageous or even necessary to discover message errors on the way to the cloud and from the cloud.

In this way, e.g., a safety-oriented control system can be adapted to respective situations more flexibly. Here, although the link to the cloud is possibly not very reliable, it does not adversely affect the safety of the control. This is because any safety system is fashioned such that faults always lead to a safe state, e.g., as a result of a corresponding reaction by safe actuators. The availability of corresponding operating functions is therefore reduced, however.

Transferring the safety-oriented control device as a safety-oriented control application into the cloud is advantageous, e.g., particularly in the context of a use as a temporary replacement for a safety controller situated in the installation. In this way, the invention also enables a more flexible safety-oriented control system.

The apparatus or installation can be configured for example, as a machine, a device, a robot, or a production installation, or can comprise such parts as components. Such an apparatus or installation can comprise, e.g., one or a plurality of such or comparable components, drives, sensors, machines, devices, or communication devices.

Furthermore, the apparatus or installation can be configured, for example, as an apparatus or installation for protecting persons or the surroundings or environment, or can comprise such an apparatus or installation. Such apparatuses can be or comprise, for example, protection devices or warning devices, such as light barriers, light arrays, and/or motion sensors. Furthermore, apparatuses or installations can also be cameras, protective guards having corresponding closing and opening devices or mechanisms, smoke or fire detectors, sprinkler installations, emergency-off devices, or comparable apparatuses or installations, or can comprise such apparatuses or installations.

The control device can be, e.g., a programmable logic controller (PLC), for example, a modular programmable logic controller. The control device can, for example, also be configured as any kind of computer or computer system that is configured for controlling an apparatus or installation and for this purpose can comprise, e.g., a real-time operating system. A control device can, for example, also be configured as a computer, a computer system or data network or a cloud on which control software or a control software application, e.g., a control application, is implemented or instantiated.

Three aspects of system safety may very generally be considered with respect to safety in the machine, installation and/or production environment.

A first aspect is "primary safety", which concerns risks such as electric shock and burns that are caused directly by the hardware.

A second aspect is "functional safety", which encompasses the safety of equipment (the "EUC"—see below), which depends on measures taken to reduce risks and is thus associated with the proper functioning of these measures.

A third aspect is indirect safety, which concerns the indirect consequences of improper functioning of a system, such as the generation of incorrect information by an information system such as a medical database.

The standard "IEC 61508" substantially concerns the second of these aspects, i.e., functional safety. However, the principles used there are indeed generally applicable.

In the area of safety when handling or controlling machines and installations, there are furthermore three sector-specific standards that are worth mentioning in addition to IEC 61508. The German standard DIN 19250 entitled "Fundamental safety aspects to be considered for measurement and control equipment" had already been developed before the first drafts of the international standard, and its content was used therein. The US standard S84 was developed at the same time as the precursor of IEC 61508, and it was shaped according to its principles. Furthermore, the international standard IEC 61511 was developed following IEC 61508 in order to enable a genuine sector-specific interpretation for the process industry.

The safety architectures and concepts presented in the context of the present description may be based on the standards IEC 61508, IEC 61131-6, ISO 13849, IEC 62061, and/or IEC 61511, and/or may be configured such that they satisfy the stipulations of at least one of these standards. These standards define safety functions formed by a safety system (e.g., a corresponding control device in accordance with the present disclosure or components or modules for such a control device).

The standard 61131-2, by contrast, contains requirements in respect of industrial suitability (EMC, environmental influences, etc.). This standard therefore particularly concerns the control devices within a safety-oriented system.

The term "safety requirement level" used in the context of the present description originates from the field of functional safety and is also referred to as safety level or safety integrity level (SIL) in the international standardization in accordance with IEC 61508/IEC 61511. It serves for assessing electrical/electronic/programmable electronic systems with regard to the reliability of safety functions. The level sought then gives rise to safety-oriented design principles that have to be complied with in order for the risk of a malfunction to be minimized.

Some definitions are given below which are formulated on the basis of part 4 of IEC 61508 and are used in the context of the present description. The terms chosen to be defined are those which are deemed to be the most important in association with the present description.

Equipment under control (EUC): equipment, machines, apparatuses or installations which are used for production, process, transport, medical or other activities.

EUC control system: system which reacts to input signals from the process and/or from an operator and generates output signals which cause the EUC to work in the desired manner. Such EUC control systems can comprise for example one or more safety-oriented control devices or safety applications, e.g. in accordance with the present description.

Programmable electronic system (PES) or electrical/electronic/programmable electronic system (E/E/PE system): in each case a system for controlling, protecting or monitoring on the basis of one or more programmable electronic apparatuses, including all elements of the system such as power supplies, sensors and other input apparatuses, communication connections and other communication means and also actuators and other output apparatuses. One example of such an E/E/PE system may be e.g., safety-oriented control devices or safety applications, e.g., in accordance with the present description.

Safety: freedom from unacceptable risk.

Safe state: state of a machine or installation in which there is no unacceptable risk resulting from the apparatus or installation.

Safety-related system or safety-oriented system: a system that implements the required safety functions which are required to attain or maintain a safe state for the EUC; and is intended, by itself or with other safety-relevant E/E/PE systems, other safety-relevant technologies and/or external devices for reducing risks, to attain the required safety integrity for the required safety functions.

Functional safety: part of the overall safety in association with the EUC and the EUC control system, dependent on the proper function of the safety-relevant systems E/E/PE, other safety-relevant technological systems and external devices for reducing risks.

Safety function: function that is to be fulfilled by a safety-related E/E/PE system, some other safety-related technological system or external risk reducing devices which are intended to attain or maintain a safe state for the EUC with regard to a specific dangerous event.

Safety integrity: probability that a safety-related system will satisfactorily execute the required safety functions under all specified conditions within a specific period of time.

Software safety integrity: part of the safety integrity of safety-related systems and concerns measures that ensure the software of a programmable electronic system attains the corresponding safety functions under all defined conditions within a defined time.

Hardware safety integrity: part of the safety integrity of safety-related systems that relate to random hardware faults in a dangerous state.

Safety integrity level (SIL): discrete level (one of four possible levels) for defining the safety integrity requirements of the safety functions that are to be assigned to the safety-related E/E/PE systems, where SIL 4 represents the highest measure of safety integrity and SIL 1 represents the lowest measure of safety integrity.

Specification of the safety needs: specification containing all needs with regard to safety functions that a safety-oriented system must execute or satisfy.

Specification of the requirements with respect to safety functions: specification containing the requirements in respect of the safety functions that must be executed by the safety-related systems. [A part of the safety requirement specifications.]

Specification of the safety integrity requirements: specification containing the requirements in respect of the safety integrity of the safety functions that must be executed by the safety-related systems. This is integrated in the specification of the safety requirements.

As already explained above, safety functions, inter alia also in association with the present description, are such functions that are to be fulfilled by a safety-related E/E/PE system, some other safety-related technological system or external risk reducing devices and that are intended to attain or maintain a safe state for the EUC with regard to a specific dangerous event.

In contrast thereto, in safety technology, and also in the present disclosure, an operating function denotes a function that is used in association with the control of the apparatus or installation and to which the criteria for a safety function are not applied and that do not have to satisfy these criteria. In this context, an operating function can also be configured as a non-safety-oriented function.

In association with functional safety, and also in association with the present disclosure, therefore, the functions that must satisfy safety-oriented criteria (e.g., as defined in association with the present description and the standards cited therein) are referred to as safety functions, while the functions for controlling the apparatus or installation which do not have to comply with these criteria are referred to as operating functions.

A safety-oriented control device can configured such that it is possible to guarantee that a dangerous state cannot arise during operation of the safety-oriented control device, for example, as a result of a failure of a component. A safety-oriented control device can furthermore be configured such that an unacceptable risk resulting from the apparatus or installation cannot arise in the context of operation of the safety-oriented control device.

In association with a safety-oriented control device, for example, the following mechanisms can be implemented in the context of software and/or hardware safety integrity:

in order to detect random errors, self-tests that involve checking for example the availability of a central assembly, of input-output cards, of interfaces and of peripherals are constantly implemented in the safety-oriented control device;

the hardware can have a redundant design in order to be able to detect errors in hardware or during the execution of the control program;

during the execution of a control program, "coded processing" can be provided to be able to detect errors in the execution of the control program;

additional test and monitoring functions can be executed: monitoring of the power supply system voltage, test of the central processing units with regard to the writability of flags, addressing tests and the like, test of the input channels, test of the output channels, tests of the data transfer via an internal bus.

A safety-oriented control device can be configured, for example, such that it has a safety-relevant operating system. The system can, for example, satisfy a safety standard, e.g., the standard IEC 61131-2. Conformity to a safety standard enables the safety-oriented controllers to be protected from interference, polarity reversals and/or overvoltages, for example.

The safety-oriented controller can have two subunits, for example, which both together are synchronized with one another such that before an output value is output at various points in the program sequence, output values can be compared with one another. If an output of one subunit then differs from that of the other subunit, the value is prevented from being output. In reaction to such an error, it is possible to restart the program sequence, to ascertain the error via a diagnosis device and/or either to interrupt the processing or to rectify the error.

In particular, a safety-oriented control device can be designed and configured to conform to at least one of the standards IEC 61508, DIN 19520 or IEC 61511.

The safety-oriented control device can be configured, for example, as a programmable logic controller (PLC). Furthermore, the safety-oriented control device can also be configured as a modular programmable logic controller (modular PLC).

The safety-oriented control device can furthermore also be configured as an EDGE device, where such an EDGE device can comprise, for example, an application for controlling apparatuses or installations. By way of example, such an application can be configured as an application having the functionality of a programmable logic controller. Here, the EDGE device can be connected, for example, to a control device of the safety-oriented installation or directly to an apparatus or installation to be controlled. Furthermore, the EDGE device can be configured such that it is additionally also connected to a data network or a cloud or is configured for connection to a corresponding data network or a corresponding cloud.

A safety-oriented control application can be configured, for example, as a realization of a safety-oriented control device in program code or as software. In such a case, such software or such a program code can be configured such that it generates the functionality of a safety-oriented control device upon execution on a computer. By way of example, a safety-oriented control application can furthermore also be configured as a simulation or simulation software for a safety-oriented control device.

The implementation of the first safety-oriented control application in the cloud can be configured, for example, such that the first safety-oriented control application is configured as a software application, for example, in accordance with the present description, and the software application, or an instance of the software application, is installed or implemented in the cloud.

A safety-oriented control program can be configured such that it is possible to guarantee that a dangerous state, for example, resulting from a failure of a component, cannot arise during the execution of the safety-oriented control program in the context of the control of the apparatus or installation. A safety-oriented control program can be configured such that an unacceptable risk resulting from the apparatus or installation cannot arise during the execution of the safety-oriented control program in the context of the control of the apparatus or installation.

In particular, a safety-oriented control program can be designed and configured to conform to at least one of the standards IEC 61508, DIN 19520 or IEC 61511.

A cloud can be any data network and/or any infrastructure that enables access to and use of shared computer services by client devices having a cloud capability. A cloud can be a public cloud that is accessible via the Internet via devices with Internet connectivity and corresponding authorizations for using the services.

In this case, the cloud can furthermore also be designed and configured as a cloud platform. Here, a cloud platform, in addition to the data network structure of the cloud, for example, can also comprise software tools that make it possible to implement or manage, for example, cloud and/or user software or cloud and/or user services in the cloud. In some scenarios, a cloud as a cloud platform can be provided as a Platform-as-a-Service (PaaS) by a cloud provider, and the services, for example, of a manufacturer of automation solutions or safety automation solutions can be stored and executed on the cloud platform as a cloud-based service.

In some of these configurations, access to the cloud or cloud platform and, for example, to corresponding services can be made available to customers as a subscription service by an owner of the services. Alternatively, the cloud or cloud platform can be a private cloud that is operated internally by an industrial enterprise, for example. An exemplary private cloud or cloud platform can consist of or comprise a series of servers which host corresponding services and are situated in an enterprise network protected by a firewall.

The first safe state, and very generally any safe state, can be a state specified by defined apparatus or installation parameters, for example. Furthermore, the first safe state or a safe state very generally can for example also be configured as a safe state in accordance with the standard IEC 61508.

Such defined apparatus or installation parameters can comprise, e.g., specific individual values for such apparatus or installation parameters or corresponding combinations thereof. Furthermore, the defined apparatus or installation parameters can also comprise value ranges for specific machine or installation parameters.

A plurality of safe states can also be defined or stipulated for an apparatus or installation, where each of the safe states can be configured in accordance with the present disclosure.

Safe states can be afforded, for example, by switching off, stopping and/or de-energizing an apparatus or installation. Furthermore, safe states can be afforded for example by a specific position or location of the machine or installation or of respective parts thereof. Safe states can, for example, also be afforded by a shutdown or a specific speed of the apparatus or installation or of parts thereof.

Value ranges for apparatus or installation parameters can be for example parameter ranges that lead to a specific position or location range for the apparatus or installation or respective parts thereof. Accordingly, value ranges for apparatus or installation parameters can be, for example, parameter ranges which lead to a specific speed range for the apparatus or installation or respective parts thereof.

A safe state, or the first safe state, can also be afforded by a sequence of parameter values. In this regard, the sequence of parameter values can be configured, for example, such that the apparatus or installation or respective parts or components thereof adopt(s) operating states corresponding to the respective parameter values successively according to the sequence of parameter values. In this way, the safe state can e.g., also be defined as a sequence of states that ultimately lead to a safe end state being safely attained.

The triggering of a safe reaction can be understood to mean, for example, the triggering of a safety function of a safety-oriented system within the meaning of the standard IEC 61508.

Triggering of a safe reaction can be attained, for example, by virtue of specific measured sensor values exceeding specific limit values stipulated in the safety-oriented system. Furthermore, the presence of a specific sensor value can also trigger a corresponding safe reaction. Examples of such sensor values can be, for example, the sensor value of a light barrier or of a touch switch, or measured values for specific temperatures, measured pollutant concentrations, specific acoustic information, brightness values or similar sensor values. Corresponding sensors can be, for example, any kind of light or touch sensors, temperature sensors, a wide variety of cameras or comparable sensors.

Furthermore, the triggering of a safe reaction in the context of safety-oriented control can, for example, also be attained by virtue of specific variables used in the context of the safety-oriented control adopting predetermined values or exceeding and/or falling below specific limit values. Such variables can be, for example, variables that are stored in a "process image" of a programmable logic controller or/and are used in the context of the execution of a safety-oriented control program. Furthermore, such variables can also be, for example, "flags" or "tags" such as can be used in the context of the control of a system or of a corresponding SCADA system (SCADA: Supervisory Control and Data Acquisitions; e.g. an operational control and observation system).

The safety-oriented communication connection can be configured, for example, as a safe transmission system, e.g., in accordance with the standard IEC 61784-3.

By way of example, the safety-oriented communication connection can be configured as a communication connection by way of a fieldbus protocol, an Ethernet protocol or an industrial Ethernet protocol on which a safety protocol is furthermore implemented. Such safety protocols can be configured, for example, in accordance with the "Profisafe" standard or comparable standards.

In this case, the apparatus or installation and/or the cloud or cloud platform can each comprise a communication interface designed and configured for communication via the safety-oriented communication connection.

Furthermore, the cloud platform is also configured such that a safety-oriented communication connection is also present, for example, between an abovementioned communication interface of the cloud platform and the safety-oriented control application within the cloud platform.

In one embodiment, the communication interface can be a wired communication interface with connection ports for a wired communication connection, in particular Ethernet ports or USB ports. Alternatively, the communication interface can also be designed and configured as a wireless communication interface for wireless communication, e.g., as a WLAN, Bluetooth and/or mobile radio interface.

In one possible embodiment, a communication interface can be configured to receive a request signal for transmission of a safeguarded sensor value or control parameter via the safety-oriented communication connection and/or accordingly, in response to receiving the request signal, to transmit a corresponding safeguarded sensor value and/or control parameter via the safety-oriented communication connection.

In one advantageous embodiment, the control system can comprise a second safety-oriented control device configured for executing the at least one first safety function and/or at least one second safety function. Here, the second safety-oriented control device and the apparatus or installation can be communicatively coupled via a second safety-oriented communication connection.

The second safety-oriented control device can be configured, for example, according to the first safety-oriented control device in accordance with the present disclosure.

The second safety-oriented communication connection can proceed e.g., via the same physical medium (e.g., the same line or both being wireless) or else via different physical media (e.g., different lines). Here, the second safety-oriented communication connection can furthermore be configured according to the first safety-oriented communication connection in accordance with the present disclosure.

Furthermore, a control system in accordance with the present disclosure can be=configured=such=that the second safety-oriented control device for executing the at least one first and/or second safety function is=configured as a second safety-oriented control application (250) implemented in the cloud. Alternatively, the second safety-oriented control device (250) for executing the at least one first and/or second safety function can be=configured as a structurally separate electronic safety-oriented control device (250).

The structurally separate electronic control device can be configured as a programmable logic controller (PLC), for example, a modular programmable logic controller. The controller can furthermore also be any kind of computer or computer system that was constructed and configured for controlling an apparatus or installation. The controller can, for example, also be a computer or a computer system on which control software or a control software application, e.g., a control application, runs.

The configuration of this safety-oriented control device as a structurally separate electronic safety-oriented control device can configured, for example, such that an electronic control device formed as hardware is wholly or partly surrounded by a housing or has or comprises a housing. Here, the electronic control device can be, for example, freely movable or else, for example, via the housing, releasably or fixedly connected to other devices, objects or apparatuses. By way of example, such an electronic control device can be secured or securable to a top-hat rail and be connected via, for example, a common carrier or/and a plug to further parts or modules for the control of an apparatus or installation (e.g., via a backplane bus).

In this case, provision can furthermore also be made for the second safety-oriented control device and/or control application to be communicatively coupled to the apparatus or installation via a second safety-oriented communication connection.

This advantageous embodiment in which the control system comprises a second safety-oriented control device enables, for example, the following variants for the safety-oriented control of an apparatus or installation:

$1^{st}$ variant: some safety functions are processed in the cloud, and the others still as before on a safety controller designed as hardware on site (of interest for brown field extensions).

Instead of the entire safety application, in this case only some safety functions run in the cloud (temporarily or permanently). This temporary use of the cloud is expedient particularly if the installation that is in operation is intended to continue to be operated but some safety components need to be exchanged or removed (saving of shutdown times of brown field applications).

In this case, the safety functions implemented in the electronic safety component to be exchanged can then be transferred into the cloud in order then subsequently to exchange or renew this safety component. After exchange has been carried out, the corresponding safety functions can then be transferred back again from the cloud into the then exchanged or renewed electronic safety component. The safety property of these safety functions is ensured here by the temporary transfer into the cloud.

$2^{nd}$ variant: the safety functions of the safety control are processed redundantly (that is to say additionally) in the cloud. It is only if both channels yield identical results that they become active; otherwise, the safe state is adopted. The entire safety arises from the redundancy. (Of interest for brown field extensions).

In addition to an existing safety application in a safety-oriented electronic control device, a copy of the safety application (an additional channel) runs in the cloud (redundancy). As a result, safety can be maintained if the existing safety application cannot or must not be used any more without being changed. A linkage of the channels is implemented here (redundancy for safety), the redundancy that arises in this case being safety-relevant. That means that different values of the channels indicate a safety problem that must be reacted to safely. Shutdown times can be shortened here. Although the original safety control continues to be used, the linkage of the channels requires additional hardware and/or software. (Of interest particularly for brown field).

$3^{rd}$ variant: the safety functions of the safety control are processed redundantly in the cloud. However, the redundancy here serves the purpose of availability: if one channel fails, the other channel can carry on operating. Each channel is sufficiently safe, for example by way of the use of coded processing in each of the controllers.

The entire safety application is duplicated, such that both a local safety application implemented in a safety-oriented electronic controller and a parallel safety application in the cloud already by themselves produce the necessary safety (redundancy for availability). If an error occurs within one safety application, the other channel will carry on operating and ensure safety (failsafe highly available system). The availability of the entire installation is increased here.

Furthermore, a control system in accordance with the present description can be configured such that the second safety-oriented control device is configured for executing the at least one first safety function, and that the first and second safety-oriented control device are configured for executing the at least one first safety function in parallel.

In this case, with respect to the at least one first safety function, the control system can be configured for example in accordance with variant two or variant three mentioned above. In this case, for example, depending on the variant chosen, there would be a redundancy between the first and second safety-oriented control devices with regard to the at least one first safety function, where the redundancy can be established to be safety-relevant, for example. In this case, the control system can be configured, for example, such that attaining a safe state is triggered if different results are generated upon the execution of the at least one first safety function in the first and second safety-oriented control devices.

Furthermore, as already mentioned above, the redundancy can, for example, also be configured for attaining an increased availability. In this case, upon the occurrence of an error in one of the two safety-oriented control devices upon the execution of the at least one first safety function, the respective other of the safety-oriented control devices then performs the control.

In one advantageous embodiment, the first and second safety-oriented control devices are configured that after parallel execution of the at least one first safety function by the first and second safety-oriented control device, a result of the respective execution of the at least one first safety function can be in each case present and a fault measure is then initiated if the results differ, in particular that adopting a safe state by the apparatus or installation (400, 420, 430) is provided as the fault measure.

The safety functions of the safety control are processed redundantly (that is to say additionally) in the cloud. It is only if both channels yield identical results that they become active; otherwise, the safe state is adopted. The safety then arises, at least partly, from the redundancy. This embodiment of the invention is of interest for example for extensions of so-called brown field installations, where, e.g., as a result of a safety control in a cloud in addition to an existing control at the installation or apparatus, a safe control for the installation or apparatus can be attained.

As already described, a fault measure can comprise for example adopting a safe state, outputting an error message, outputting one or more warning signals (for example, warning sounds and/or light signals), switching off a power supply and/or comparable measures.

In an alternative embodiment thereto, it can be provided that in the case of erroneous execution of the at least one first safety function by one of the two safety-oriented control devices, the result of the execution of the at least one first safety function by the other safety-oriented control device is used for controlling the apparatus or installation. Here, erroneous execution can be present for example if an error is detected upon execution of a safety function.

Such an error can be detected, e.g., if dissimilar results or intermediate results are ascertained upon parallel execution of the safety function within a safety-oriented controller.

Furthermore, an error can be detected, for example, if an error is ascertained in the context of the execution of a safety function via a "coded processing" and/or "diversified encoding" method.

Erroneous execution can, for example, also be present if no result is yielded by the execution of the at least one safety function within one of the safety-oriented controllers, although a result should actually be yielded. Furthermore, erroneous execution can, for example, also be present if in the context of the execution of the at least one safety function within one of the safety-oriented controllers, an error message is generated and/or output by the corresponding controller.

With this embodiment, the safety functions of the safety controllers are processed redundantly, e.g., in the cloud, locally, or else respectively one in the cloud and one locally. In this embodiment, the redundancy serves the purpose, at least inter alia, of availability: if one channel fails, the other channel can carry on operating. In this case, the respective safety functions within the safety controllers can for example respectively each per se already be implemented sufficiently safely, for example through the use of so-called "coded processing".

In one advantageous embodiment, a control system in accordance with the present disclosure can be configured such that the execution of the at least one first safety function by the first safety-oriented control application, and/or the execution of the at least one first and/or second safety function by the second safety-oriented control device, are/is implemented using a "coded processing" method.

In a further advantageous embodiment, it can furthermore be provided that the execution of the at least one first safety function by the first safety-oriented control application, and/or the execution of the at least one first and/or second safety function by the second safety-oriented control device, are/is implemented using a "diversified encoding" method using coded processing.

The implementation or use of a coded processing method makes it possible to allow program sequences for controlling machines or installations to proceed in a safety-oriented manner, independently of hardware used. As a result, corresponding control systems can be fashioned even more flexibly, for example.

Generally, and in association with the present description, "coded processing" or a "coded processing" method is understood to mean a software solution, also referred to as "software coded processing". Owing to its hardware independence, this solution offers the flexibility of constructing safety-critical systems with non-safety-critical hardware.

In this case, a coded processing method can be configured, for example, such that by performing coding of a corresponding program code, and/or coding of data that are then processed by the program code, and subsequently corresponding checking steps using the processed data, a check for specific possible malfunctions that have occurred during the program sequence of the program code is made possible.

ISO standard 26262 lists coded processing in volume 5, under D2.3.6, as a technology for discovering hardware execution errors (ISO/DIS 26262—Road vehicles—Functional safety, Technical Report, Geneva, Switzerland, July 2011). IEC standard 61508 lists coded processing in volume 2, in A.4 (Functional safety of electrical/electronic/programmable electronic safety-related systems. Technical Report IEC 61508, The International Electrotechnical Commission, 3, Rue de Varembé, Case postale 131, CH-1211, Geneva 20, Switzerland, 2010.), as a possible solution for being able to detect execution errors in safety-oriented control systems.

Software coded processing (SCP) is based on the coded processing technology from P. Forin (P. Forin, Vital coded microprocessor principles and application for various transit systems, IFA-GCCT, pages 79-84, September 1989). SCP adds information redundancy to a software program in order to discover execution errors. In order to integrate SCP in a software program, either the program has to be manually rewritten or a code transformation tool that operates in an automated manner can be used. SCP is applied to the entire safety-critical data flow of a program: all constants, variables and operations must be coded in order to be able to use SCP.

Various codings and embodiment possibilities for coded processing and diversified encoding are described in the literature. In this regard, see, e.g., in:

P. Forin. Vital coded microprocessor principles and application for various transit systems. In IFA-DCCT, pages 79-84, September 1989;

Ute Schiffel, Martin Süßkraut, and Christof Fetzer. An encoding compiler: Building safety-critical systems with commodity hardware. In SAFECOMP'09: Proceedings of the 28th International Conference on Computer Safety, Reliability, and Security, pages 283-296, Berlin, Heidelberg, 2009. Springer-Verlag;

Ute Schiffel, André Schmitt, Martin Süßkraut, and Christof Fetzer. ANB- and ANBDmem-Encoding: Detecting Hardware Errors in Software. In Erwin Schoitsch, editor, Computer Safety, Reliability, and Security, volume 6351 of Lecture Notes in Computer Science, pages 169-182. Springer Berlin/Heidelberg, 2010;

Oh, N.: Mitra, S.; McCluskey, E. J., "ED4I: error detection by diverse data and duplicated instructions", IEEE Transactions on Computers, vol. 51, issue 2, p. 180-199; and German Patent Specification DE 10 219 501 B4.

One of the most widespread codings in the context of coded processing is the AN coding: each value in the program is multiplied by a constant A. Values that are not a multiple of A are evaluated as invalid. With SCP, all operations must work with these coded values. An execution error generates invalidly coded values.

One frequent application of the coded processing methodology in the area of realizing functional safety is the "diversified encoding with software coded processing" method. In this case, the combination of "diversified encoding" with "coded processing" achieves a flexible solution for discovering execution errors which affords the possibility of attaining the safety levels ASIL-D and SIL-4.

In this case, the "diversified encoding" mentioned above is based on two different executions of the same safety function. These two executions are:

Native execution: the native execution corresponds to the execution of the original safety function without coding. In this case, the source code for the original safety function forms the source code of the native execution. The native execution operates on native (original) input values and the native state. It only changes the native state. The result of the native execution is the native output.

Coded execution: the coded execution (using coded processing) is based on the coded variant of the safety function. It operates on coded input values and the coded state. The result is the coded output.

Both executions are totally independent calculations, which operate on the same values, however. The coded input values are the coded variants of the native input values. The source code of the native safety function is used to create the source code of the coded execution. The creation can be effected either manually or—recommended for reproducibility—using a tool.

The component that calls the safety function detects and treats execution errors with the aid of checksums. The "diversity framework" generates two checksums: one over the native output values and one over the coded output values. The caller component operates exclusively with the native inputs and outputs. After the safety function has been executed, the caller component has to compare the checksum over the native outputs with the checksum over the coded outputs. If the checksums are different, an execution error has been discovered and must be treated.

A control system in accordance with the present disclosure can furthermore be configured such that at least one operating function is furthermore provided for controlling the apparatus or installation, where the control system furthermore comprises a further control device for executing the at least one operating function, the further control device being communicatively coupled to the apparatus or installation.

In this case, the operating function and also the control device can be designed and configured, for example, in accordance with the present disclosure. Furthermore, the further control device can be configured, for example, as a safety-oriented or a non-safety-oriented control device.

This embodiment makes it possible, besides safety-oriented functionalities with regard to an apparatus or installation, also to execute in parallel functionalities that do not satisfy corresponding safety-oriented criteria, without safety-oriented controllers or control applications of the control system having to be used for this purpose. Use of a further control device for implementing such operating functions makes it possible, for example, to use a non-safety-oriented control device for this purpose. Such non-safety-oriented control devices are generally technically simpler to realize and also less expensive. In this way, the controllers used can be employed more efficiently and more purposefully, which further increases the flexibility of a corresponding controller.

In this case, the control system can be configured, for example, such that the further control device for executing the at least one operating function is configured as a second control application implemented in the cloud.

Alternatively, the control system can also be configured such that the further control device for executing the at least one operating function is configured as a structurally separate electronic control device.

The structurally separate design of the further control device can be designed and configured, for example, such that the further control device has or comprises a housing. The structurally separate configuration of the further control device can furthermore be configured according to the present disclosure.

In this case, it is possible, e.g., to use the cloud both for the safety control and for the regular control. This embodiment makes possible, for example, a system in which safety and operating functions are processed completely in the cloud. Safe communication between the safety controller and the apparatus or installation, e.g., using the=PROFIsafe protocol, is necessary=to ensure the safety of the system.

The above-mentions objects and advantages are also achieved by a method for operating a control system in accordance with the present disclosure, where information is transmitted via the first safety-oriented communication connection from the apparatus or installation to the first safety-oriented control application in the cloud, the at least one safety function is then executed by the first safety-oriented control application using the installation information, and control information for the apparatus or installation is subsequently transmitted from the first safety-oriented control application via the first safety-oriented communication connection to the apparatus or installation.

Such a method makes it possible, for example, to use the cloud as a temporary or permanent replacement for a separate safety controller. In this case, the safety functions are processed completely in the cloud. Safe communication between the first safety-oriented control application and the apparatus or installation, e.g., using the PROFIsafe communication protocol, is advantageous or possibly even necessary to discover message errors on the way to the cloud and from the cloud.

Using such a method, e.g., a corresponding safety-oriented control system can be adapted to respective situations more flexibly.

In this case, installation information can be any kind of information from the apparatus or installation that is used or is necessary for controlling the apparatus or installation. It can be, for example, any kinds of sensor data, measurement data, property data, network addresses, communication information or further information regarding the apparatus or installation, or a state of the apparatus or installation.

The execution of the at least one safety function using such installation information can be configured, for example, such that the installation information mentioned above is processed, for example, by the first safety-oriented control application, where, at least inter alia, the corresponding control information for the apparatus or installation was generated.

Such control information can be any kind of data or information that can be processed and/or implemented or is implemented by the apparatus or installation if it was transmitted via a communication connection to the apparatus or installation.

This embodiment makes it possible, for example, for all safety functions to be processed in the cloud. Furthermore, it is also possible for some safety functions to be processed in the cloud, and the others still as before on the safety controller on site (of interest for brown field extensions).

The method can furthermore be implemented such that installation information is transmitted both via the first safety-oriented communication connection from the apparatus or installation to the first safety-oriented control application in the cloud and via the second safety-oriented communication connection to the second safety-oriented control device, and then the at least one safety function is executed by the first safety-oriented control application using the installation information, a first result being generated, and furthermore the at least one safety function is executed by the second safety-oriented control device using the installation information, a second result being generated.

Afterward, the first and second results are then compared, where in the case of matching results, control information for the apparatus or installation is transmitted from the first safety-oriented control application via the first safety-oriented communication connection to the apparatus or installation, or in the case of matching results, control information for the apparatus or installation is transmitted from the second safety-oriented control device via the second safety-oriented communication connection to the apparatus or installation.

With this method, two parallel control devices or control applications can generate a safety-oriented functionality such that in parallel on both of them the same safety function is executed, and it is only if both obtain the same result that this is actually used for a corresponding control action of the apparatus or installation.

If both controllers produce different results, then for example a fault measure can be initiated in accordance with the present disclosure, such as attaining a safe state.

In this case, one of the controllers is implemented in the cloud, while the second controller can be implemented either in the cloud or as corresponding control hardware.

Here, the method also makes it possible, for example, to use the cloud as, e.g., a temporary or permanent replacement for a separate safety controller.

Here, too, therefore, using such a method, e.g., a corresponding safety-oriented control system can be adapted to respective situations more flexibly.

In this case, the method explained above can furthermore be configured such that it is only in the case of matching results that control information for the apparatus or installation is transmitted from the safety-oriented control application via the first safety-oriented communication connection to the apparatus or installation.

The method described above can furthermore be d configured such that in the case of non-matching results, a corresponding fault measure is initiated. Such a fault measure can be or comprise, for example, the adoption of a safe state by the corresponding apparatus or installation. Furthermore, such a fault measure can be or comprise outputting a warning message and/or a warning signal and/or switching off a power supply. Such a fault measure or the initiation of such a fault measure can also be configured in accordance with the present disclosure.

Installation information can be configured, for example, in accordance with the present disclosure. The installation information can be, e.g., a sensor value or measured value, information regarding the installation or one or more components of the installation, information regarding a state of the installation or of one or more components of the installation, or comparable information, or can comprise such information.

In this case, a result produced in accordance with the method described above can correspond, for example, to control information in accordance with the present disclosure. Furthermore, a result can also be configured as any output that is generated or is generable upon the execution of the safety function by the corresponding control device or control application.

The control information, too, can be configured in accordance with the present disclosure. In this case, the control information can, e.g., furthermore correspond to the result produced upon the execution of the safety function, be based on the result or be further information independent of the result.

The safety functions of the safety controller are processed redundantly (i.e., additionally) in the cloud. It is only if both channels yield identical results that they become active; otherwise, the safe state is adopted. The entire safety arises from the redundancy. (Of interest for brown field extensions).

Furthermore, a method for operating a control system in accordance with the present description can also be configured such that installation information is transmitted both via the first safety-oriented communication connection from the apparatus or installation to the first safety-oriented control application and via the second safety-oriented communication connection to the second safety-oriented control device, then the at least one safety function is executed by the first safety-oriented control application using the installation information, and furthermore the at least one safety function is executed by the second safety-oriented control device using the installation information.

In this case, if erroneous execution of the safety function in one of the two control devices is detected, then control information for the apparatus or installation is output from the other of the safety-oriented control devices via the associated safety-oriented communication connection.

In the proposed method, the safety functions of the safety controller can be processed redundantly. However, here, in contrast to the method described above, the redundancy serves the purpose of availability: if one channel fails, then the other channel can carry on operating. Each channel is sufficiently safe, e.g., by virtue of the use of a coded processing method.

With the method described above, two parallel control devices or control applications can generate a safety-oriented functionality in such a way that the same safety function is executed in parallel on both of them. In this case, on each of the controllers, the safety-oriented functionality is executed such that both respectively by themselves satisfy the criteria in respect of a safety-oriented controller, for example, via an implementation by coded processing.

In the context of this presently contemplated embodiment of the method, the results of the implementation of the safety-oriented functionality of both controllers are regularly compared or, in the context of the implementation of the safety-oriented functionalities by each of the controllers, the latter are checked for corresponding erroneous executions. If both results match or if no erroneous execution was detected, then the common value generated is used for the control of the apparatus or installation.

If erroneous execution is detected during the implementation of the safety-oriented functionality in one of the controllers, for example, in a checking step in accordance with the coded processing method, then the result of the implementation of the safety-oriented functionality of the other controller is used for the control of the apparatus or installation. However, this is performed, e.g., only if erroneous execution was likewise not detected during the implementation of the safety-oriented functionality by the other controller.

In this case, one of the controllers is implemented in the cloud, while the second controller either can be implemented in the cloud or can be provided as corresponding control hardware.

Here, too, the method makes it possible, for example, to use the cloud as a temporary or permanent replacement for a separate safety controller.

Therefore, here, too, through the use of such a method, e.g., a corresponding safety-oriented control system can be adapted to respective situations more flexibly.

In this case, the installation information, the control information, the safety-oriented communication connections, the apparatus or installation, the first safety-oriented control application, the second safety-oriented control device, the at least one safety function can furthermore be configured in accordance with the present disclosure.

In one advantageous embodiment, a method in accordance with the present description can be implemented such that the execution of the safety function by the first safety-oriented control application or the first safety-oriented control device, and/or the execution of the safety function by the second safety-oriented control device, are/is effected using a "coded processing" method.

Furthermore, the execution of the at least one first safety function by the first safety-oriented control application or the first safety-oriented control device, and/or the execution of the at least one first and/or second safety function by the second safety-oriented control device, are/can be also effected using a "diversified encoding" method using "coded processing".

In this case, the "coded processing" method and respectively the "diversified encoding" method" can be in accordance with the present disclosure.

The above described objects and advantages are furthermore achieved via a safety-oriented control application for a control system in accordance with the present disclosure, where in the context of performing a corresponding method in accordance with the present disclosure, the safety-oriented control application is configured for comparing the first and second results. Furthermore, in the case where the first and second results match, the safety-oriented control application is then also configured for outputting the control information for the apparatus or installation.

In this case, the safety-oriented control application can be configured, for example, in accordance with the present disclosure.

The comparison of the first and second results can also be configured in accordance with the present disclosure.

Furthermore, the control application can be configured, for example, such that it is configured for defining the control application or control device, which, in the case of matching results, then communicates this matching result to the apparatus or installation. Such a definition, or corresponding information regarding this definition, can be stored, for example, in a storage device to which the control application has access. Furthermore, provision can be made for the fact that it is defined or can be defined that a fault measure is initiated if the results do not match in the context of the control application. Furthermore, what fault measure is then initiated can be defined. For example, the fact that a fault measure is initiated, or what fault measure this is, can in each case likewise be stored in a storage device to which the control application has access.

In this case, the fault measure, and the initiation of the fault measure, can for example also be designed and configured in accordance with the present description.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below by way of example with reference to the accompanying figures.

In the figures.

DETAILED DESCRIPTION OF THE EXEMPLARY EMBODIMENTS

Figure 1:
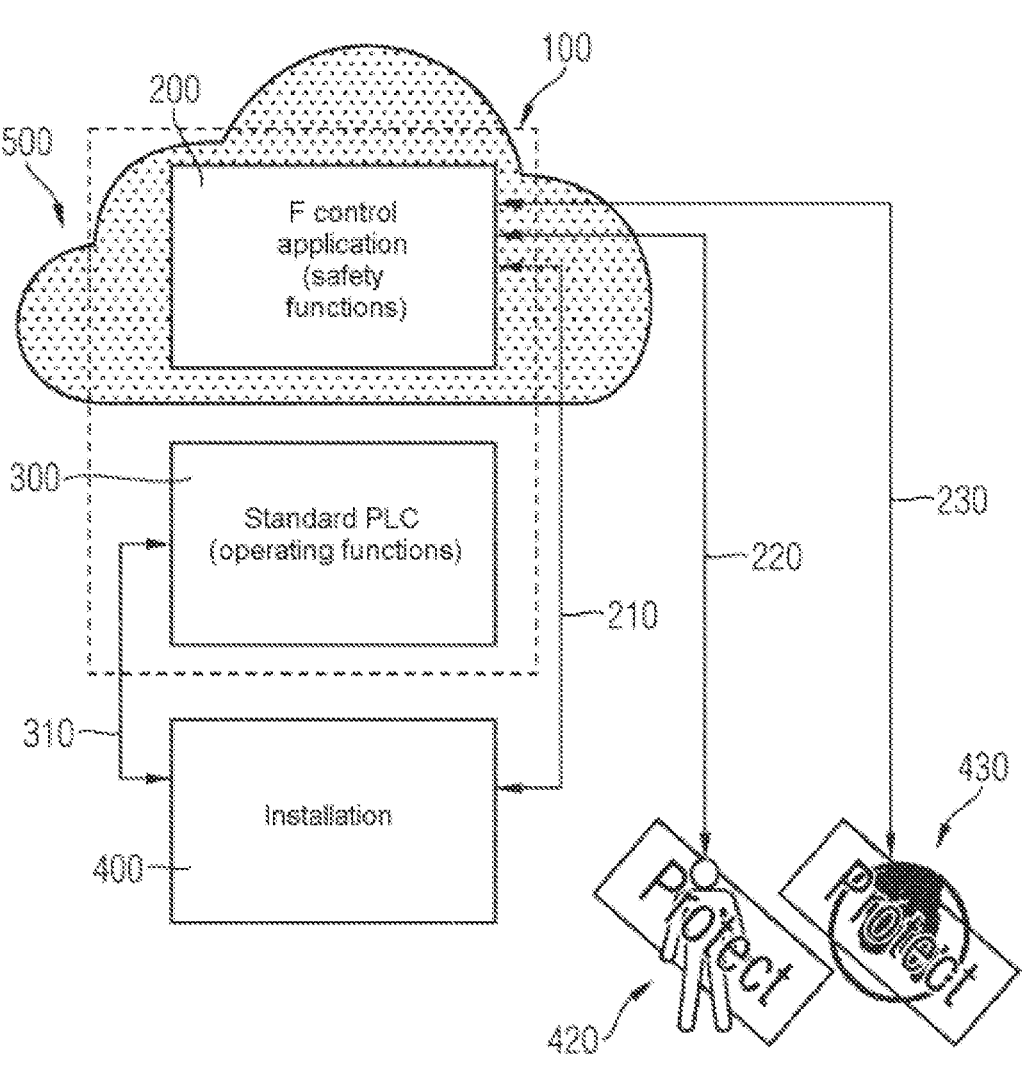
FIG. 1 shows an exemplary installation controller with a safety-oriented control application in the cloud and a standard controller as hardware in accordance with the invention.

FIG. 1 shows a control system 100 comprising a safety-oriented control application 200 implemented in a cloud 500. Furthermore, the control system comprises a standard PLC 300 or a standard controller 300 designed and configured as a hardware control device. The safety-oriented control application 200 is linked to an installation 400 via a corresponding safety-oriented communication connection 210 and controls in said installation safety-relevant processes via corresponding installation safety functions of the safety-oriented control application 200 by way of sensors and actuators correspondingly provided in the installation 400.

Furthermore, the safety-oriented control application 200 is connected to a person protection device 420 via a further safety-oriented communication connection 220. Person safety functions are furthermore provided in the safety-oriented control application 420, and interact with corresponding sensors and actuators of the person protection device 420 for the protection of persons operating the installation 400. Such a person protection device 420 can comprise, for example, corresponding barriers, motion sensors, closing mechanisms, light barriers, and/or emergency-off pushbuttons.

Furthermore, the safety-oriented control application 200 is connected to a corresponding environment protection device 430 via an additional safety-oriented communication connection 230. Environment safety functions are furthermore provided in the safety-oriented control application 200, and interact with corresponding sensors and actuators of the environment protection device 430 for the protection of the environment against damage resulting from malfunctions of the installation 400. Such an environment protection device 430 can comprise, for example, ventilation devices, sprinkler installations, smoke detectors, temperature sensors, and/or gas detectors.

In this case, the installation 400, the person protection device 420 and the environment protection device 430 in interaction with the control system 100 are configured in accordance with the standard IEC 61508 for attaining functional safety.

Non-safety-relevant functions of the installation 400 are furthermore controlled by the standard PLC 300 situated in the area of the installation 400, via installation operating functions implemented in the standard PLC 300.

This results in an efficient control system 100 for the installation 400 and the person and environment protection devices 420, 430 in which safety-relevant control mechanisms are provided in the cloud 500, while the basic controls of the installation are effected via the standard PLC 300.

In this case, by way of example, a coded processing method can be implemented in the safety-oriented control application 200. Alternatively, the safety-oriented property of the safety-oriented control application 200 can also be realized by way of two independently internally implemented parallel control sequences.

Figure 2:
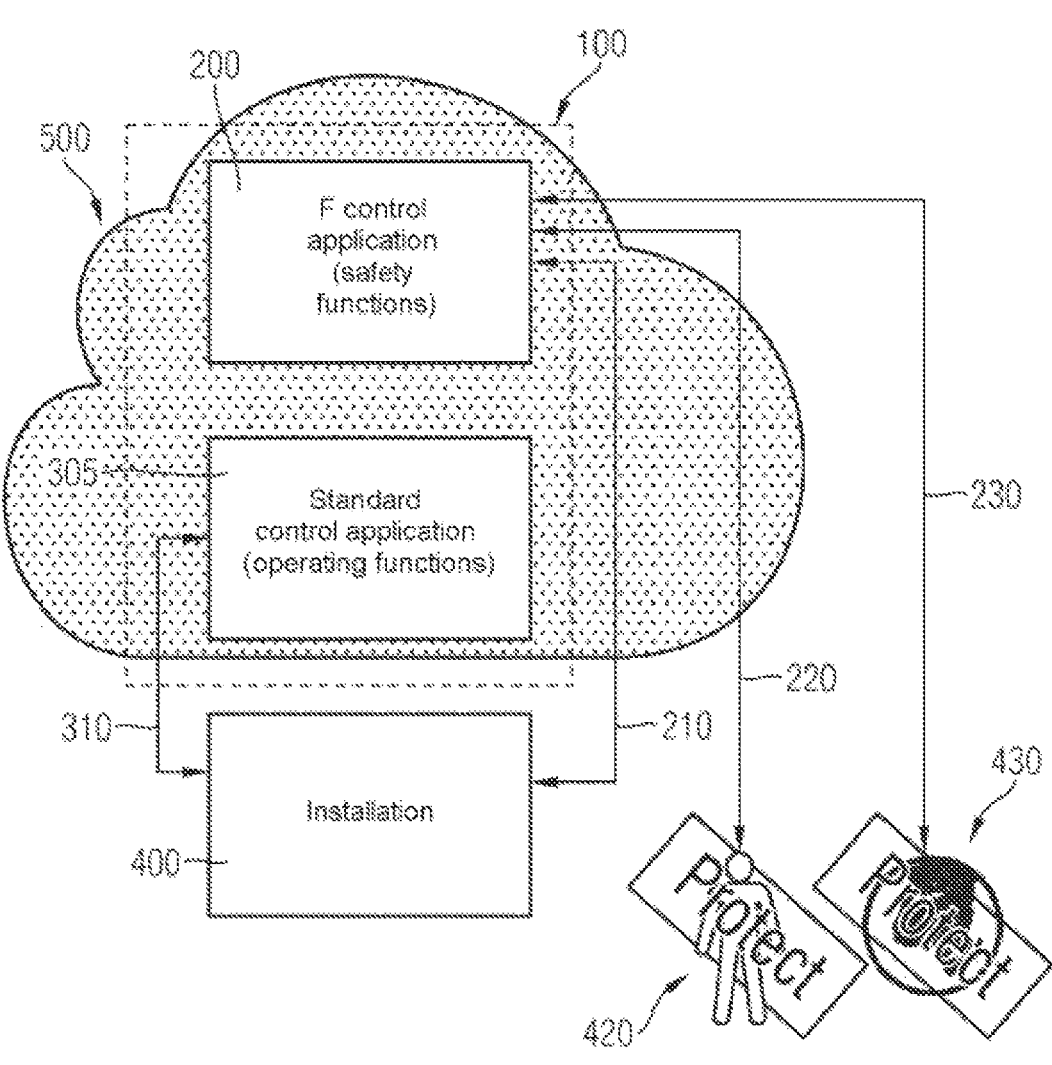
FIG. 2 shows an exemplary installation controller with a safety-oriented control application and a standard control application in the cloud in accordance with the invention.

FIG. 2 shows a modification of the system illustrated in FIG. 1 by virtue of the fact that instead of the standard PLC 300 formed as hardware in the context of the system illustrated in FIG. 1, a standard control application 305 is provided, which is now likewise implemented in the cloud 500. This standard control application 305 illustrated in FIG. 2 controls the non-safety-relevant functionalities of the installation 400 instead of the standard PLC 300 illustrated in FIG. 1.

The meaning of the further reference signs illustrated in FIG. 2 corresponds to that from FIG. 1.

Figure 3:
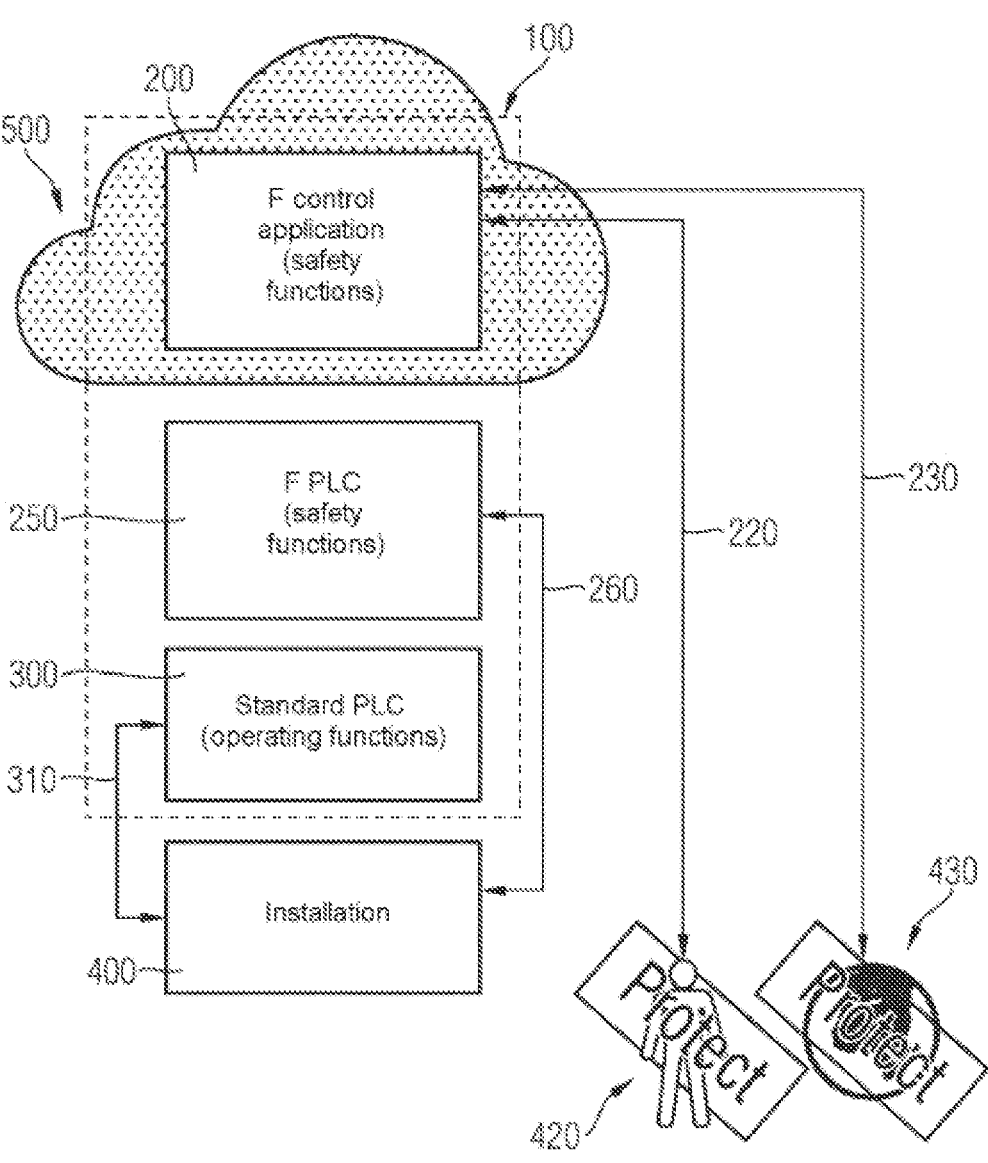
FIG. 3 shows an exemplary installation controller with a first safety-oriented control application in the cloud and a safety-oriented controller and also a standard controller in each case as hardware in accordance with the invention.

FIG. 3 shows a further modification of the system illustrated in FIG. 1 by virtue of the fact that a second safety-oriented controller 250 is additionally provided, which is formed as a local hardware controller or local hardware PLC. The safety-oriented functions or safety functions of the installation 400 are controlled by the second safety-oriented controller 250 via a second safety-oriented communication connection 260, while the safety functions of the person and environment protection devices 420, 430 are furthermore controlled from the cloud by the safety-oriented control application 200.

In this case, the second safety-oriented PLC 250 is likewise situated in the area of the installation 400.

The meaning of the further reference signs illustrated in FIG. 3 corresponds to that of the reference signs from FIG. 1.

The control system 100 illustrated in FIG. 3 is configured such that the installation safety functions for the safety-oriented control of the installation 400 are implemented in the local second safety-oriented control device 250, which is implemented in hardware. The person and environment safety functions are provided in the safety-oriented control application 200 implemented in the cloud 500.

This results in more efficient safety-oriented control of the installation 400 and of the person and environment protection safety devices 420, 430 by virtue of the fact that, e.g., fast acting safety mechanisms for the installation 400 are implemented within the safety-oriented PLC 250 situated on site and safety functions for person and environment protection measures, which are possibly allowed to have, e.g., longer response times, are implemented flexibly and locally independently in the cloud 500.

Figure 4:
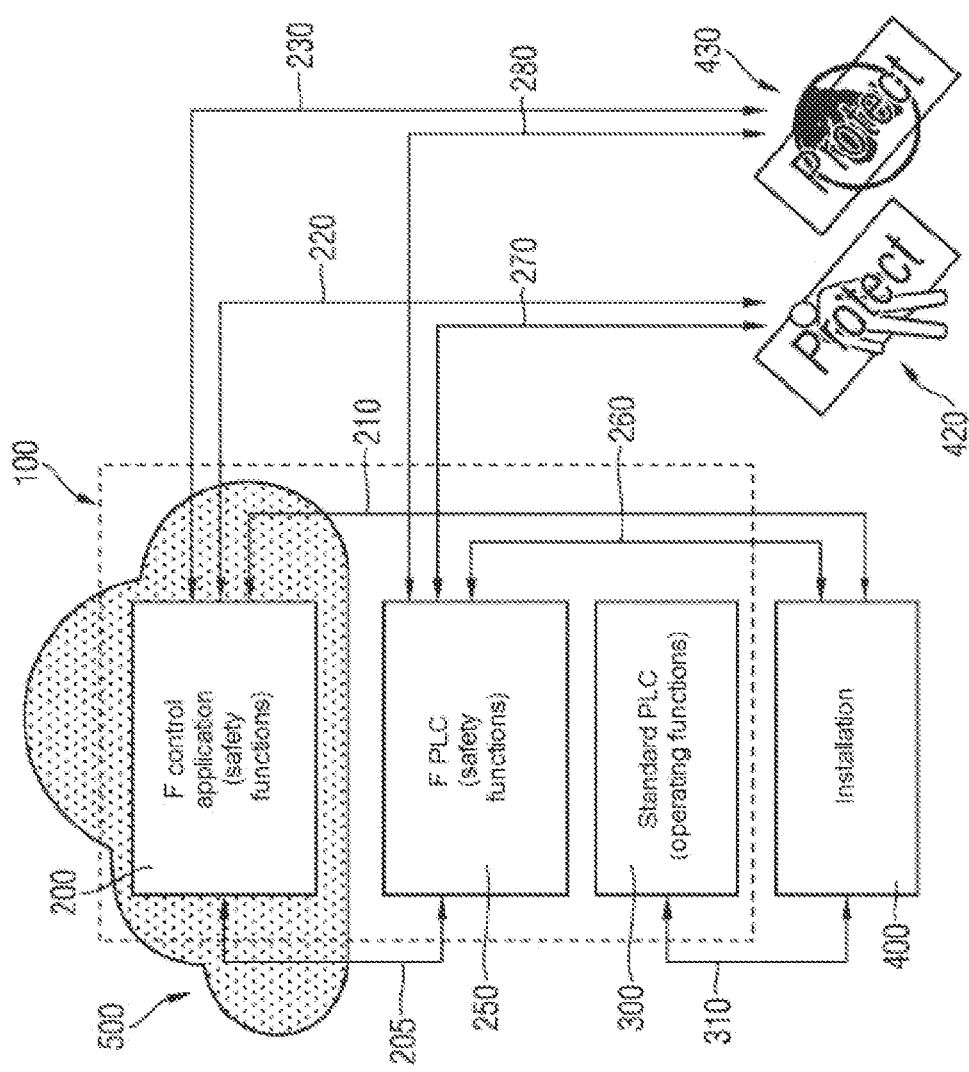
FIG. 4 shows an exemplary installation controller with a first safety-oriented control application in the cloud and a safety-oriented controller and also a standard controller in each case as hardware in accordance with the invention, where the first safety-oriented control application and the safety-oriented controller are coupled.

FIG. 4 illustrates a further possible embodiment of the system illustrated in FIG. 3. Here, all safety functions for controlling the installation 400 and the person and environment protection devices 420, 430 are implemented both in the safety-oriented control application 200 implemented in the cloud and in the safety-oriented local PLC 250. For this purpose, provision is made of respective safety-oriented communication connections 210, 220, 230 from the safety-oriented control application 200 in the cloud 500 to the installation 400, the person protection device 420 and the environment protection device 430. Correspondingly, provision is made of corresponding safety-oriented communication connections 260, 270, 280 from the local safety-oriented PLC 250 to the installation 400, the person protection device 420 and the environment protection device 430.

In a first operating mode of the control system 100 illustrated in FIG. 4, the safety-oriented control application 200 in the cloud 500 and the local safety-oriented PLC 250 implemented in hardware are connected via a further communication connection 205. Here, the safety-oriented control application 200 and the local safety-oriented PLC 250 are configured such that in both of them the control program or the control programs for controlling the installation 400, the person protection device 420 and the environment protection device 430 are executed in parallel in both controllers 200, 250. Here, the control devices 200, 250 are configured for the cyclic processing of the control programs, in which case after each cycle the output signals respectively calculated for the installation 400, the person protection device 420 and the environment protection device 430 are compared, the calculated output signals being output to the respective installation parts 400, 420, 430 only if they match.

In this way, a redundancy needed for the safety-oriented property of the corresponding control system 100 can be attained by the interaction of the control application 200 with the PLC 250. In this case, the controllers 200, 250 can be configured in such a way so as to define which of the two controllers then outputs the output value to the installation 400, the person protection device 420 and the environment protection device 430 if the calculated values of both controllers 200, 250 match.

Furthermore, the controllers 200, 250 are configured such that in the case in which the values calculated by both controllers 200, 250 do not match, the installation 400, the person protection device 420 and the environment protection device 430 are brought to a corresponding safe state by one of the two controllers 200, 250, or else by both of them.

In this first operating mode described, a corresponding functional safety of the control system 100 would already be attained just by virtue of the described redundancy of the two controllers 200, 250, which can be provided, for example, as additional safety with respect to safety measures already provided in the control application 250 and the local PLC 250, such as execution of the control program via a coded processing mechanism.

In a second operating mode of the control system 100 illustrated in FIG. 4, the safety-oriented control application 200 and the safety-oriented local PLC 250 are likewise coupled via the communication connection 205. However, in this second operating mode, the two safety-oriented control devices 200, 250 are configured such that as a rule one of the two controllers 200, 250 performs the control of the installation 400, the person protection device 420 and the environment protection device 430, while in the other of the control devices 200, 250 the control program is executed in parallel therewith, but no output signals are output to the installation 400, the person protection device 420 and the environment protection device 430.

If a fault then occurs in the controlling safety-oriented control device 200, 250, which fault was detected, for example, via an implemented coded processing mechanism, then this faulty control device 200, 250 communicates information or a message concerning taking over the control functionality to the other of the safety-oriented control devices 200, 250 via the communication connection 205.

Accordingly, this other safety-oriented control device 200, 250 then takes over the control of the installation 400, the person protection device 420 and the environment protection device 430, while the control activity of the originally controlling safety-oriented control device 200, 250 is deactivated.

With this second operating mode, for example, in particular the availability of the safety-oriented control for the installation 400, the person protection device 420 and the environment protection device 430 can be increased, which further reduces the overall probability of failure of the control system 100.

With regard to the illustrated operating modes of the control system 100 illustrated in FIG. 4, the first operating mode can be summarized, for example, as a safety-increasing mode and the second operating mode as an availability-increasing mode of the control system 100 illustrated in FIG. 4.

Figure 5:
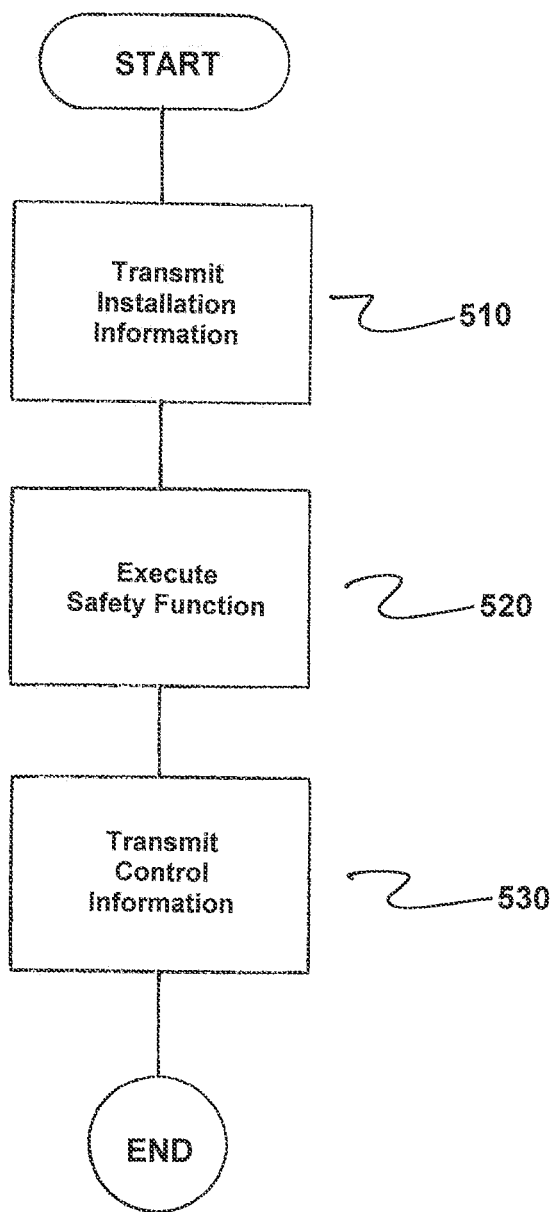
FIG. 5 is a flowchart of the method in accordance with the invention.

FIG. 5 is a flowchart of the method for operating a control system 100 for controlling an apparatus or installation 400, 420, 430, where at least one first safety function is provided with respect to controlling the apparatus or installation 400, 420, 430, where the control system 100 comprises a first safety-oriented control device 200 configured to execute at least one first safety function, and where the first safety-oriented control device 200 is configured as a first safety-oriented control application 200 implemented in a cloud 500 and the first safety-oriented control application 200 and the apparatus or installation 400, 420, 430 are communicatively coupled via a first safety-oriented communication connection 210, 220, 230.

The method comprises transmitting installation information via the first safety-oriented communication connection 210, 220, 230 from the apparatus or installation 400, 420, 430 to the first safety-oriented control application 200 in the cloud 500, as indicated in step 510.

Next, the at least one safety function is executed by the first safety-oriented control application 200 utilizing the installation information, as indicated in step 520.

Next, control information for the apparatus or installation 400, 420, 430 is transmitted from the first safety-oriented control application 200 via the first safety-oriented communication connection 210, 220, 230 to the apparatus or installation 400, 420, 430, as indicated in step 530.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control system for controlling an apparatus or installation, at least one first safety function being provided with respect to controlling the apparatus or installation, the control system comprising:

a first safety-oriented control device configured to execute at least one first safety function;

a second safety-oriented control device configured to execute the at least one first safety function;

wherein the first safety-oriented control device is configured as a first safety-oriented control application implemented in a cloud;

wherein the first safety-oriented control application and the apparatus or installation are communicatively coupled via a first safety-oriented communication connection, and the second safety-oriented control device and the apparatus or installation are communicatively coupled via a second safety-oriented communication connection;

wherein the first safety control application is connected to a person protection device via a further safety-oriented communication connection;

wherein the safety-oriented control application is connected to an environment protection device via an additional safety-oriented communication connection; and wherein the first and second safety-oriented control device are configured to execute the at least one first safety function in parallel.

2. The control system as claimed in claim 1, wherein the second safety-oriented control device is configured to execute at least one second safety function.

3. The control system as claimed in claim 2, wherein one of (i) the second safety-oriented control device for executing at least one of the at least one first safety function and the second safety function is configured as a second safety-oriented control application implemented in the cloud, and (ii) the second safety-oriented control device for executing at least one of the at least one first safety function and the second safety function is configured as a structurally separate electronic safety-oriented control device.

4. A safety-oriented control application for the control system as claimed in claim 2, wherein, in a context of implementing a method for operating the control system to control the apparatus or installation, the safety-oriented control application compares the first and second results, and when the first and second results match, the safety-oriented control application outputs the control information for the apparatus or installation.

5. The control system as claimed in claim 2, wherein the first and second safety-oriented control device are configured such that after parallel execution of the at least one first safety function by the first and second safety-oriented control device, a result of a respective execution of the at least one first safety function is each present and a fault measure is then initiated if the results differ.

6. The control system as claimed in claim 5, wherein the fault measure comprises adoption of a safe state by the apparatus or installation.

7. The control system as claimed in claim 2, wherein in cases of erroneous executions of the at least one first safety function by one safety-oriented control device of the first and second safety-oriented control devices, a result of the execution of the at least one first safety function by another of the first and second safety-oriented control devices is utilized to control the apparatus or installation.

8. The control system as claimed in claim 1, wherein at least one of (i) execution of the at least one first safety function by the first safety-oriented control application and (ii) execution of at least one of the at least one first and second safety function by the second safety-oriented control device is implemented utilizing a "coded processing" method.

9. The control system as claimed in claim 8, wherein at least one of (i) the execution of the at least one first safety function by the first safety-oriented control application and (ii) the execution of at least one of the at least one first and second safety function by the second safety-oriented control device is implemented utilizing a "diversified encoding" method utilizing the coded processing.

10. The control system as claimed in claim 1, further comprising:

at least one operating function for controlling the apparatus or installation; and a further control device for executing the at least one operating function, said further control device being communicatively coupled to the apparatus or installation.

11. The control system as claimed in claim 10, wherein the further control device for executing the at least one operating function is configured as one of (i) a second control application implemented in the cloud and a structurally separate electronic control device.

12. A method for operating a control system for controlling an apparatus or installation, at least one first safety function being provided with respect to controlling the apparatus or installation, the control system comprising:

a first safety-oriented control device configured to execute at least one first safety function, the first safety-oriented control device being configured as a first safety-oriented control application implemented in a cloud and the first safety-oriented control application and the apparatus or installation being communicatively coupled via a first safety-oriented communication connection; and a second safety-oriented control device configured to execute at least one first safety function, the second safety-oriented device and the apparatus or installation being communicatively coupled via a second safety-oriented communication connection, the method comprising:

transmitting installation information via the first safety-oriented communication connection from the apparatus or installation to the first safety-oriented control application in the cloud and via the second safety-oriented communication connection to the second safety-oriented control device;

executing the at least one safety function by the first safety-oriented control application utilizing the installation information, a first result being generated;

executing the at least one safety function by the second safety-oriented control device utilizing the installation information, a second result being generated; and transmitting control information for the apparatus or installation from the first safety-oriented control application via the first safety-oriented communication connection to the apparatus or installation;

wherein the first and second safety-oriented control device are configured to execute the at least one first safety function in parallel;

wherein the safety control application is connected to a person protection device via a further safety-oriented communication connection; and wherein the safety-oriented control application is connected to an environment protection device via an additional safety-oriented communication connection.

13. The method for operating a control system as claimed in claim 12, wherein the second safety-oriented control device is configured to execute at least one second safety function, the method further comprising:

comparing the generated first and second results are subsequently compared; and when the generated first and second results match one of (i) transmitting control information for the apparatus or installation is transmitted from the first safety-oriented control application via the first safety-oriented communication connection to the apparatus or installation and (ii) transmitting control information for the apparatus or installation from the second safety-oriented control device via the second safety-oriented communication connection to the apparatus or installation.

14. The method for operating a control system as claimed in claim 12, wherein the second safety-oriented control device is configured to execute at least one second safety function;

wherein, after detection of erroneous execution of the safety function in one safety-oriented control device of the first and second safety-oriented control devices, control information for the apparatus or installation is output from another safety-oriented control device of the first and second safety-oriented control devices via an associated safety-oriented communication connection.

15. The method as claimed in claim 12, wherein the execution of at least one of (i) the safety function by the first safety-oriented control application or control device and (ii) the safety function by the second safety-oriented control device is implemented utilizing a "coded processing" method.

16. The method as claimed in claim 15, wherein the execution of at least one of (i) the at least one first safety function by the first safety-oriented control application or control device and (ii) at least one of the at least one first and second safety function by the second safety-oriented control device is implemented utilizing a "diversified encoding" method utilizing the "coded processing".

* * * * *